Nov. 22, 1966  ZENYU TAKEDA  3,286,999
COOLING TOWER

Filed July 2, 1964  3 Sheets-Sheet 1

INVENTOR.
Zenyu Takeda
BY Kelman and Berman
Agents

United States Patent Office
3,286,999
Patented Nov. 22, 1966

3,286,999
COOLING TOWER
Zenyu Takeda, Nagahama, Japan, assignor to Mitsubishi Plastics Industries Ltd., Chiyoda-ku, Tokyo, Japan
Filed July 2, 1964, Ser. No. 380,008
5 Claims. (Cl. 261—30)

This application is a continuation-in-part of my copending application Serial No. 322,460, filed on November 8, 1963, and now abandoned.

This invention relates to a packing material for a cooling tower.

It is known to contact water with air in cooling towers, and to reduce the temperature of the water partly by direct transfer of thermal energy from the water to the air, and partly by evaporation of the water, whereby thermal energy is withdrawn from the residual water in the form of latent heat of evaporation, and the water vapors are carried away with the air.

The thermal efficiency of a cooling tower is determined to an important extent by the size of the effective water-air interface per unit of water flow through the tower, and also by the degree of turbulence of the flow of air and water adjacent the interface.

It is customary to use tower packings for increasing the effective interface of water and air, and also to induce turbulence in the two fluids at the interface. Wooden lattice-work was the earliest cooling tower packing; Raschig rings and similar shapes of ceramic material are still being widely used; and plastics have more recently been employed as construction materials for tower packings. The plastic packings are more durable than wood and offer less resistance to airflow than Raschig rings. They are much lighter than ceramics or wood for equal surface area, but plastics are more or less hydrophobic, and their surface is not readily wetted by water. The plastics available at lowest cost, most readily shaped, and otherwise most suitable, namely polyvinyl chloride and polystyrene, are strongly water repellent. Water runs over their surfaces in drops, and does not spread into a continuous film.

The primary object of the invention is the provision of a cooling tower having a packing of high thermal efficiency and low weight.

More specifically, the invention aims at a cooling tower equipped with a plastic packing which is readily wetted by the water to be cooled.

Another object is the provision of a tower packing that is readily prepared from inexpensive materials.

Yet another object is the provision of a durable tower packing.

An additional object is a tower packing which offers only minimal resistance to the flow of cooling air through the tower.

With these and other objects in view, the invention, in one of its aspects, resides in a cooling tower where the housing of which encloses a plurality of carrier members of hydrophobic plastic each of which has a surface coating of hydrophilic material on a vertically extending face. Feeding means on a top portion of the tower housing feed an aqueous liquid to the coated face so that the liquid flows over the face in a film. The liquid flowing from the face is collected at the bottom of the housing. A blower is provided for blowing air over the liquid film.

The term "plastic" is employed in this specification and in the appended claims in the customary manner to designate any one of a large and varied group of materials which consists of, or contains as an essential ingredient a synthetic resin of high molecular weight and which, while solid in the finished state, at some stage in its manufacture is soft enough to be formed into shape by flow.

Other features and many of the attendant advantages of this invention will be readily appreciated as the same becomes better understood by reference to the following detailed description when considered in connection with the accompanying drawings in which.

Figure 1:
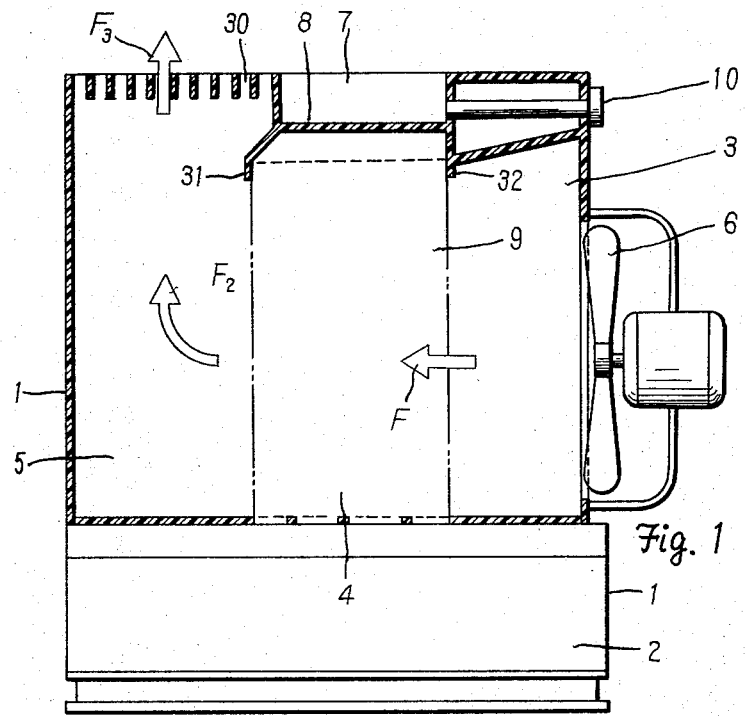
FIG. 1 shows a cooling tower of the invention in side elevation, and partly in section.
Figure 2:
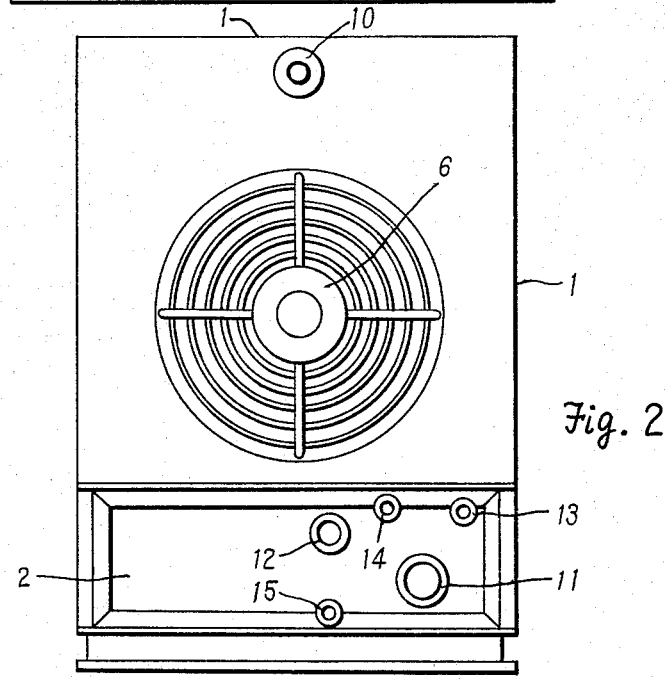
FIG. 2 illustrates the tower of FIG. 1 in front elevation.

Referring now to the drawing, and initially to FIGS. 1 and 2, there is shown a mechanical-draft tower for cooling water by partial evaporation and by contact with air. The tower includes an outer shell or housing 1 the bottom portion 2 of which constitutes a water storage tank. The space in the tower above the water tank 2 has three horizontally juxtaposed communicating portions 3, 4, 5. A blower 6 mounted on the front wall of the housing and equipped with an electric drive motor discharges air into the portion 3 in a horizontal direction. The central portion 4 normally is occupied by a stack of packing sheets 9 which has been only indicated in phantom outline in FIG. 1 for the sake of clarity. The third space portion 5 communicates with the atmosphere through openings 30 in the top of the housing 1. The space portions 3 and 5 are separated from the water tank 2 by solid walls of the housing, whereas the space 4 is downwardly substantially open.

The top of the housing 1 is shaped to form a water supply tank 7. A perforated plate 8 at the bottom of the tank 7 also forms the top of the space portion 4. Integral flange portions 31, 32 of the plate 8 extend downward to retain the packing sheets 9 in the space portion 4. A water supply conduit 10 leads to the tank 7. The water tank 2 is provided with nipples 11, 12, 13, 14, 15 for pipe connections. The water supply conduit 10 is normally connected with the pipe connection 11 by a circulating pump which withdraws cooled water from the tank 2, drives it to the apparatus which is to be cooled by the water, and then returns the heated water to the tank 7.

The nipple 12 is normally connected to an automatic feeding device, such as an auxiliary tank equipped with a float valve, which maintains a constant water level in the tank 2 during tower operation. The nipple 13 is normally connected to a manually operated valve in a water line for filling the tank 2 at the start of operations, and the nipple 15 provides a drain opening for emptying the tower of liquid, and is normally plugged. Accidental overfilling is prevented by the nipple 14 which provides an overflow opening.

The structure described so far operates in a well known manner. The packing in the tower, in effect, divides the tower space into three compartments. The space portion 3 is an air pressure and air distribution compartment in which the air propelled by the blower 6 is distributed under pressure over the vertical air flow section of the tower. The space portion 4 constitutes a heat exchange compartment in which the horizontally flowing air makes contact with the water which is distributed by the plate 8 over the horizontal water flow section of the tower. The air, heated and humidified by crossflow contact with the water, is collected in the compartment 5 and discharged therefrom to the atmosphere. The hot water is cooled and partly evaporated in the heat exchange compartment 4, and the cooled water is collected in the storage tank 2 from which it is withdrawn by the non-illustrated circulating pump. The evaporation losses are made up by water admitted through the nipple 12. The path of the air through the tower is indicated by arrows $F$, $F_2$, and $F_3$.

While other materials of construction will readily suggest themselves to those skilled in the art to meet specific requirements, rigid or non-plasticized polyvinyl chloride has been found well suited for constructing the tower shown in FIGS. 1 and 2, except the drive motor for the blower 6. The tower may be assembled from polyvinyl chloride sheets by welding in a known manner.

This invention is more particularly concerned with the packing employed in the tower, and in the cooperation of the packing with other elements of the tower. As seen in FIGS. 3a, 3b, 4, and 5, the packing consists of plastic sheet structures whose vertical height in the general direction of water flow and horizontal width in the direction of air flow are much greater than their thickness.

Figure 3A:
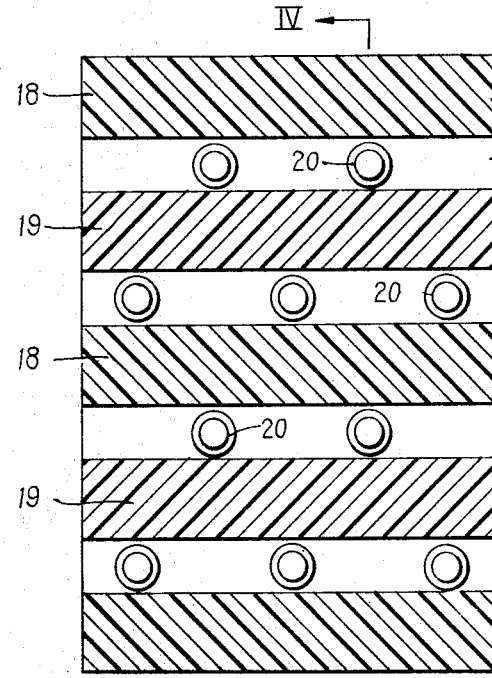
FIGS. 3a and 3b show two types of packing sheets of the invention for the cooling tower of FIG. 1 in enlarged side elevational views.
Figure 4:
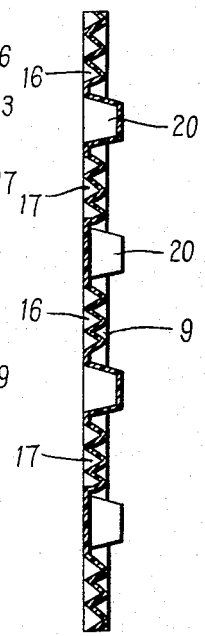
FIG. 4 shows the packing sheet of FIG. 3a in front elevational section on the line IV—IV.

The packing sheet 9 shown in FIG. 3a has vertically offset horizontally extending bands of corrugations 16, 17 which are separated from each other by horizontally extending generally smooth strip portions 33. The parallel grooves 18 between the ribs of the corrugated bands 16, as viewed in FIG. 3a, obliquely descend from the left toward the right, whereas the corresponding grooves 19 in the bands 17 obliquely descend from the right toward the left. The bands 16, 17 alternate in a vertical direction.

The smooth strip portions 33 of the sheet 9 which are free from grooves are formed on one side with frustoconical hollow projections 20 which are higher than the ribs of the corrugated bands 16, 17. The projections 20 are horizontally spaced in a row in each smooth portion 33. The individual projections in each smooth portion are horizontally offset from the projections 20 in the vertically adjacent smooth strip portions 33.

When filling the heat exchange compartment 4 of the tower, the individual sheets 9 of the stack are held at precisely defined distances by the projections 20. Of the four smooth strip portions 33 of the sheet 9, two are provided with two projections 20, and two with three projections. Every other sheet is installed in an inverted position with respect to that shown in the drawing, so that the projections 20 of each sheet abut against flat portions of an adjacent sheet.

In a typical packing sheet of the invention, the sheet consists mainly of polyvinyl chloride. The spacing of the bands 16, 17 is 25 millimeters, and the grooves are inclined at an angle of 30° with respect to a horizontal plane. The width of each groove 18, 19 is 8 millimeters, and its depth 3 millimeters. Other dimensional relationships can be read from the drawing.

Figure 5:
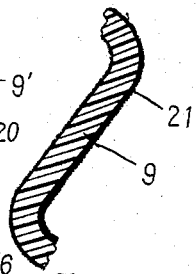
FIG. 5 shows a detail of FIG. 4 on a much larger scale.

As seen in FIG. 5, the sheet 9 is coated on both faces with a layer 21 of small, uniform particles of powdered rice which are secured to the sheet surface in spaced relationship by a binder mainly consisting of polyvinyl chloride, and not itself capable of pictorial representation on the scale of FIG. 5.

Figure 3B:
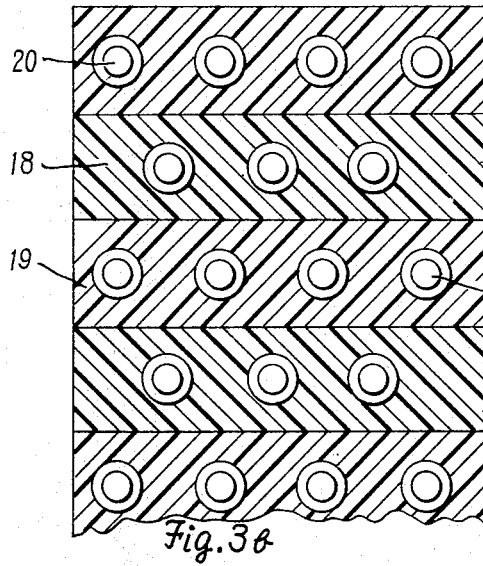

The packing sheet 9′ illustrated in FIG. 3b differs from the sheet shown in FIG. 3a by the omission of the smooth strip portions between adjacent bands 16, 17 of corrugations 18, 19. The rows of projections 20 are vertically centered in each band.

When water drips through the perforated plate 8 on a stack of juxtaposed sheets 9 or 9′ in the heat exchange compartment 4, the high wettability of the layer 21 causes the water to spread on the face of the sheets 9 or 9′ in a thin film. The water, in descending follows the configuration of the sheet surfaces. The opposite inclinations of the grooves in successive corrugated bands causes turbulence in the film which enhances heat exchange. The thin corrugated sheets permit a very large liquid surface to be exposed to the air stream in a small area. The projections 20 also contribute to an enlarged interface between water and air, and to the turbulence at the interface.

The material of construction for the carrier sheets 9, 9′ may be selected freely among commercial plastics. Low cost, ability of being shaped into the preferred configurations illustrated, and ability of bonding to cements are the main desired properties. All commercial plastics have adequate mechanical strength at the normal operating temperature of a cooling tower of the type described which is at or below 75° C.

Polyvinyl chloride is a preferred material of construction, but polystyrene and its copolymers are also suitable. The esters and ethers of cellulose, polyamides, polyalkylenes may have to be employed under special conditions, but have evident disadvantages. Thermoplastics generally have the advantage of being moldable by inexpensive methods and devices into the corrugated packing sheets, for example, by vacuum forming, but all commercial thermosetting plastics are obviously capable of being employed.

The hydrophilic particles in the surface layer 21 may be chosen from an almost unlimited variety of well known materials. The selection will be governed by considerations of cost and availability. The only critical requirement for the active material is wettability by water. The hydrophilic material also should be insoluble or only sparingly soluble in water in order to extend the useful life of the surface layer. Materials which readily meet these requirements may be of vegetal origin and preferably do not form hydrogels at the operating temperatures of the tower. Powdered cereals (rice, wheat, corn), also soy bean flour, potato flour, and sweet potato flour, but also sawdust from all kinds of wood may be employed. Among materials of mineral origin, calcium carbonate, magnesium carbonate, barium sulfate, diatomaceous earth, finely divided silica, sand and clay have been found to be effective. The finely divided material not only improves the wetting characteristics of the packing sheets, but also increases the true surface area of the sheet.

The finely divided hydrophilic material is held to the plastic surfaces of the sheets 9, 9′ by an adhesive binder. Suitable adhesives are commercially available. A preferred type of binder consists basically of a solution of a polymeric synthetic resin in a volatile solvent in which the hydrophilic particles do not dissolve. The hydrophilic powder is dispersed in the adhesive, and the dispersion is applied to the plastic surfaces of the sheets 9, 9′. The proportions of the ingredients in the coating mixture have to be selected to ensure adequate bonding of the hydrophilic particles to the hydrophobic plastic sheet, but to prevent coating of the hydrophilic particles with a layer of resin from the adhesive solution which would interfere with interaction between the particle surface and the water to be cooled.

Resins that have been found useful in adhesives for the purpose of this invention include polyvinyl acetals, copolymers of vinyl acetate, polyvinyl alkyl ethers polyvinyl chloride, copolymers of polyvinyl chloride and polyvinylidene chloride, copolymers of vinyl chloride and vinyl acetate, polyethyl acrylate, polybutyl methacrylate, polyisobutyl methacrylate, polyethyl methacrylate, polymethyl methacrylate, polystyrene, natural rubber, butadiene-acrylonitrile rubber, butadiene-styrene rubber, neoprene, and polyisobutylene. The polymers may be dissolved in chlorinated hydrocarbons, fatty acid esters, aromatic or aliphatic hydrocarbons, or ketones in a well known manner.

Coating compositions which have been found to be well suited for polyvinyl chloride and for polystyrene sheets are tabulated below:

TABLE 1.—COATING COMPOSITIONS FOR POLYVINYL CHLORIDE SHEETS
[Percent by weight]

| | | | | |
|---|---|---|---|---|
| Copolymer of polyvinyl chloride and polyvinyl acetate | 2.7 | 5.0 | 8.7 | 7.0 |
| Acetone | 74.6 | 74.2 | 72.0 | 73.9 |
| Methyl ethyl ketone | 8.0 | 7.5 | 6.5 | 7.0 |
| Tetrahydrofurane | 8.0 | 5.0 | 1.1 | 2.3 |
| Hydrophilic particles | ¹6.7 | ²8.3 | ¹11.7 | ³9.8 |

¹ Wheat flour.
² Soybean flour.
³ Calcium carbonate.

TABLE 2.—COATING COMPOSITIONS FOR POLYSTYRENE SHEETS
[Percent by weight]

| | | | | |
|---|---|---|---|---|
| Polystyrene | 2.7 | 5.0 | 7.0 | 8.7 |
| Xylene | 77.3 | 74.2 | 7.0 | 4.3 |
| Toluene | 13.3 | 12.5 | 76.0 | 75.3 |
| Hydrophilic particles | ¹6.7 | ²8.3 | ³10.0 | ⁴11.7 |

¹ Wheat flour.
² Diatomaceous earth.
³ Potato flour.
⁴ Wood flour.

The preferred compositions listed in Tables 1 and 2 do not cover the full range of concentrations of polymeric resin, solvent, and hydrophilic particles that may be employed. Generally, useful compositions may contain as little as 2 percent, and as much as 15 percent of the hydrophilic particles, and the amount of resin in the composition may be varied between one and ten percent, the remainder of the composition consisting essentially of volatile solvents capable of bonding the resin to the carrier sheets to be coated.

The compositions may be deposited on the carrier sheets by brushing, by spraying, by dipping, or by any other method conventionally employed for applying decorative and protective organic coatings. It is also possible to omit the hydrophilic particles from the several compositions, and only to apply the solution of the resinous material to the carrier sheets by the aforementioned methods. While the coating is still wet and tacky, the hydrophilic material is dusted on the coating surface. Evaporation of the volatile solvent completes the coating procedure in whichever manner the coating was formed.

The formation of a thin water film providing a large water-air interface per unit of water volume is further favored by the use of small amounts of surface active agents in the cooling water. A surfactant addition is practical and economical in cooling systems in which the water is circulated, and in which water loss from the system is due practically exclusively to evaporation. A concentration of surface active agent between 0.1% and 0.4% in the circulating water significantly improves the performance of the cooling tower.

Suitable surface active agents are commercially available. Anionic, cationic, and non-ionic surfactants may be employed. Cationic surfactants suppress the growth of many microorganisms and are preferred where this feature is of importance. Suitable surfactants include sodium alkylsulfonates, the several dialkyl sulfosuccinates, cetyl pyridinium bromide, and trimethyl cetyl ammonium chloride.

Figure 6:
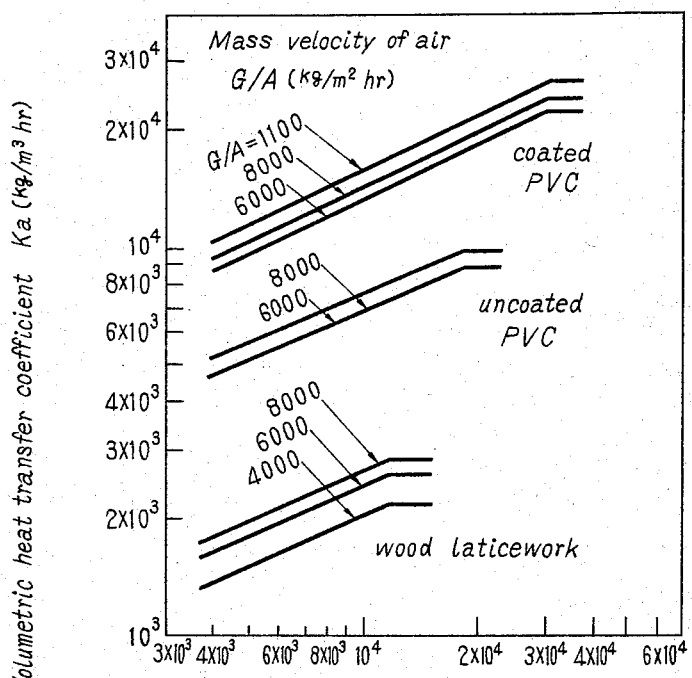
FIG. 6 is a diagram showing the relationship of the mass velocities of water and air to volumetric heat transfer coefficient when the tower of FIG. 1 is equipped with various packing materials.

FIG. 6 illustrates the difference in heat transfer characteristics of the cooling tower illustrated in FIG. 1 when packed with wood latticework, with untreated polyvinyl chloride (PVC) sheets of the shape shown in FIG. 3a, and with the same sheets when coated with a composition of the type shown in the first column of Table 1.

Heat transfer coefficients were determined with the three types of tower packings at various combinations of air and water flow rates under conditions which were otherwise held constant during the tests. The superiority of even uncoated thin plastic sheets of the corrugated shape disclosed over wooden latticework is evident, and it is seen that a coating of particulate hydrophilic material further improves the heat transfer coefficient of a cooling tower packed with plastic sheets.

Figure 7:
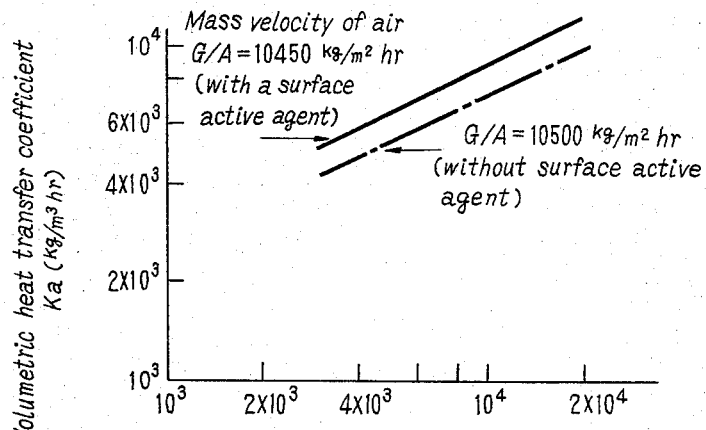
FIG. 7 diagrammatically illustrates the effects of additions to the cooling water in a manner corresponding to FIG. 6.

The additional improvement in heat transfer coefficient that is achieved with a small amount of a cationic surface active agent in the circulated water in the tower of FIG. 1 when equipped with coated polyvinyl chloride packing sheets is illustrated in FIG. 7. The tests without addition or surfactant were performed at a slightly higher rate of air flow, but it is evident that the results are not significantly affected by this fact.

While the invention has been described with particular reference to specific embodiments, it is to be understood that it is not limited thereto, but is to be construed broadly and restricted solely by the scope of the appended claims.

What I claim is:
1. A cooling tower for cooling an aqueous liquid comprising, in combination:
 (a) a housing having a top portion and a bottom portion;
 (b) a plurality of packing members in said housing, each packing member including
   (1) a carrier sheet of hydrophobic plastic having two opposite faces vertically extending in said housing in a direction from said top portion to said bottom portion,
   (2) each face of said carrier sheet being formed with a plurality of vertically offset horizontally extending bands of corrugations, each band being constituted by a plurality of ribs defining substantially parallel grooves, the grooves of two vertically consecutive bands being obliquely inclined relative to a horizontal plane in opposite directions,
   (3) said bands being vertically spaced from each other, and separated by horizontally extending substantially smooth strip portions of said sheet free from grooves,
   (4) said strip portions being formed with respective pluralities of projections higher than said ribs, the projections of each strip portion being horizontally spaced from each other and horizontally offset from the projections in a vertically adjacent strip portion;
 (c) a surface coating of hydrophilic material on said faces;
 (d) feeding means in said top portion for feeding an aqueous liquid to be cooled to the coated faces of said carrier sheet, whereby said liquid flows over said faces in respective films;
 (e) collecting means in said bottom portion for collecting the liquid flowing from said faces; and
 (f) blower means for passing a stream of air over said films.

2. A tower as set forth in claim 1, wherein said surface coating essentially consists of a binder and of a particulate hydrophilic material insoluble in said binder and substantially insoluble in water, said particulate material being dispersed in said binder.

3. A tower as set forth in claim 2, wherein said binder is a synthetic resin.

4. A tower as set forth in claim 2, wherein said hydrophobic plastic consists essentially of said synthetic resin.

5. A tower as set forth in claim 2, wherein said particulate material essentially consists of a plurality of particles spaced from each other.

References Cited by the Examiner
UNITED STATES PATENTS

| | | | |
|---|---|---|---|
| 2,356,653 | 8/1944 | Cox | 261—111 |
| 2,476,282 | 7/1949 | Castellan. | |
| 2,548,694 | 4/1951 | Wiesenthal | 261—24 |

(Other references on following page)

| | | UNITED STATES PATENTS | |
|---|---|---|---|
| 2,614,820 | 10/1952 | Boydjieff | 261—30 XR |
| 2,668,134 | 2/1954 | Horton. | |
| 2,733,160 | 1/1956 | Iler. | |
| 2,824,023 | 2/1958 | Banigan. | |
| 2,859,766 | 11/1958 | Shuldener. | |
| 2,873,908 | 2/1959 | Powers | 261—30 XR |
| 2,917,292 | 12/1959 | Hittrich | 261—112 XR |
| 2,940,168 | 6/1960 | Monroe | 261—95 XR |
| 2,977,103 | 3/1961 | Smith et al. | 261—112 XR |

FOREIGN PATENTS 521,902  3/1921  France.

OTHER REFERENCES

"Surface Active Agents" by Anthony M. Schwartz and James W. Perry; Interscience Publishers, Inc., New York; copyright 1949, pages 107, 159 and 162 relied on, TP-419S3 C. 7.

HARRY B. THORNTON, *Primary Examiner.*

RONALD R. WEAVER, *Assistant Examiner.*